United States Patent
Stewart et al.

(10) Patent No.: US 7,415,389 B2
(45) Date of Patent: Aug. 19, 2008

(54) CALIBRATION OF ENGINE CONTROL SYSTEMS

(75) Inventors: Gregory E. Stewart, Vancouver (CA);
Syed M. Shahed, Rancho Palos Verde, CA (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 11/321,504

(22) Filed: Dec. 29, 2005

(65) Prior Publication Data

US 2007/0156363 A1 Jul. 5, 2007

(51) Int. Cl.
*G06F 19/00* (2006.01)

(52) U.S. Cl. .......................... 702/185; 700/26

(58) Field of Classification Search ................. 702/185, 702/182–184, 188; 714/25; 700/26
See application file for complete search history.

(56) References Cited

U.S. PATENT DOCUMENTS

| | | | |
|---|---|---|---|
| 3,744,461 A | 7/1973 | Davis |
| 4,005,578 A | 2/1977 | McInerney |
| 4,055,158 A | 10/1977 | Marsee |
| 4,252,098 A | 2/1981 | Tomczak et al. |
| 4,383,441 A | 5/1983 | Willis et al. |
| 4,426,982 A | 1/1984 | Lehner et al. |
| 4,438,497 A | 3/1984 | Willis et al. |
| 4,456,883 A | 6/1984 | Bullis et al. |
| 4,485,794 A | 12/1984 | Kimberley et al. |
| 4,545,355 A | 10/1985 | Takao et al. |
| 4,546,747 A | 10/1985 | Kobayashi et al. |
| 4,601,270 A | 7/1986 | Kimberley et al. |
| 4,653,449 A | 3/1987 | Kamei et al. |
| 5,044,337 A | 9/1991 | Williams |
| 5,076,237 A | 12/1991 | Hartman et al. |
| 5,089,236 A | 2/1992 | Clerc |

(Continued)

FOREIGN PATENT DOCUMENTS

DE 10010978 9/2001

(Continued)

OTHER PUBLICATIONS

Abourida et al., "Real-Time PC-Based Simulator of Electric Systems and Drives," IEEE, pp. 433-438, 2002.

(Continued)

*Primary Examiner*—Edward Raymond
(74) *Attorney, Agent, or Firm*—Kris T. Fredrick

(57) ABSTRACT

A system for automatic multivariable calibration of an engine controller. The system may take inputs which include actuator setpoints, sensor measurements, performance requirements, and so forth. There may be an algorithm to compute engine calibration parameters for the controller. Each of the actuators may be separately stepped through to experimentally obtain actuator input and sensor output data. Algorithmic processing of the experimentally obtained data may be performed to calculate parameters of a model of an engine. A model based control design algorithm may then be invoked to obtain the calibration parameters for a controller. The calibrated controller may be tested with real or simulated engine conditions. The performance related to the parameters may be analyzed and determination of the acceptability of the data be made. If not acceptable, the parameters may be reprocessed. If acceptable, the calibration parameters may be downloaded to the engine controller for application and use.

15 Claims, 5 Drawing Sheets

U.S. PATENT DOCUMENTS

| | | |
|---|---|---|
| 5,108,716 A | 4/1992 | Nishizawa |
| 5,123,397 A | 6/1992 | Richeson |
| 5,233,829 A | 8/1993 | Komatsu |
| 5,282,449 A | 2/1994 | Takahashi et al. |
| 5,349,816 A | 9/1994 | Sanbayashi et al. |
| 5,351,184 A | 9/1994 | Lu et al. |
| 5,365,734 A | 11/1994 | Takeshima |
| 5,398,502 A | 3/1995 | Watanabe |
| 5,452,576 A | 9/1995 | Hamburg et al. |
| 5,477,840 A | 12/1995 | Neumann |
| 5,560,208 A | 10/1996 | Halimi et al. |
| 5,561,599 A | 10/1996 | Lu |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,846,157 A | 12/1998 | Reinke et al. |
| 5,893,092 A | 4/1999 | Driscoll |
| 5,942,195 A | 8/1999 | Lecea et al. |
| 5,964,199 A | 10/1999 | Atago et al. |
| 5,974,788 A | 11/1999 | Hepburn et al. |
| 6,029,626 A | 2/2000 | Bruestle |
| 6,035,640 A | 3/2000 | Kolmanovsky et al. |
| 6,048,620 A | 4/2000 | Zhong |
| 6,055,810 A | 5/2000 | Borland et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,216,083 B1 | 4/2001 | Ulyanov et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,321,538 B2 | 11/2001 | Hasler |
| 6,338,245 B1 | 1/2002 | Shimoda et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,379,281 B1 | 4/2002 | Collins et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,463,733 B1 | 10/2002 | Asik et al. |
| 6,463,734 B1 | 10/2002 | Tamura et al. |
| 6,470,682 B2 | 10/2002 | Gray, Jr. |
| 6,470,866 B2 | 10/2002 | Cook |
| 6,502,391 B1 | 1/2003 | Hirota et al. |
| 6,512,974 B2 | 1/2003 | Houston et al. |
| 6,546,329 B2 | 4/2003 | Bellinger |
| 6,560,528 B1 | 5/2003 | Gitlin et al. |
| 6,571,191 B1 | 5/2003 | York et al. |
| 6,579,206 B2 | 6/2003 | Liu et al. |
| 6,612,293 B2 | 9/2003 | Schweinzer et al. |
| 6,625,978 B1 | 9/2003 | Eriksson et al. |
| 6,629,408 B1 | 10/2003 | Murakami et al. |
| 6,647,710 B2 | 11/2003 | Nishiyama et al. |
| 6,647,971 B2 | 11/2003 | Vaughan et al. |
| 6,671,603 B2 | 12/2003 | Cari et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,705,084 B2 | 3/2004 | Allen et al. |
| 6,742,330 B2 | 6/2004 | Genderen |
| 6,758,037 B2 | 7/2004 | Terada et al. |
| 6,789,533 B1 | 9/2004 | Hashimoto et al. |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,061 B2 | 12/2004 | Nytomt et al. |
| 6,915,776 B2 | 7/2005 | Zur Loye et al. |
| 2001/0002591 A1 | 6/2001 | Majima |
| 2002/0029564 A1 | 3/2002 | Roth et al. |
| 2002/0056434 A1 | 5/2002 | Flamig-Vetter et al. |
| 2002/0073696 A1 | 6/2002 | Kuenstler et al. |
| 2002/0098975 A1 | 7/2002 | Kimura et al. |
| 2002/0170550 A1 | 11/2002 | Mitsutani |
| 2002/0173919 A1 | 11/2002 | Moteki et al. |
| 2002/0184879 A1 | 12/2002 | Lewis |
| 2002/0194835 A1 | 12/2002 | Bromberg et al. |
| 2003/0022752 A1 | 1/2003 | Liu et al. |
| 2003/0041590 A1 | 3/2003 | Kitajima et al. |
| 2003/0089101 A1 | 5/2003 | Tanaka et al. |
| 2003/0101713 A1 | 6/2003 | Dalla Betta et al. |
| 2003/0120410 A1 | 6/2003 | Cari et al. |
| 2003/0143957 A1 | 7/2003 | Lyon |
| 2003/0145837 A1 | 8/2003 | Esteghlal et al. |
| 2003/0150422 A1 | 8/2003 | Huh |
| 2003/0172907 A1 | 9/2003 | Nytomt et al. |
| 2003/0200016 A1 | 10/2003 | Spillane et al. |
| 2003/0213465 A1 | 11/2003 | Fehl et al. |
| 2003/0221679 A1 | 12/2003 | Surnilla |
| 2003/0225507 A1 | 12/2003 | Tamura |
| 2004/0006973 A1 | 1/2004 | Makki et al. |
| 2004/0007211 A1 | 1/2004 | Kobayashi |
| 2004/0007217 A1 | 1/2004 | Poola et al. |
| 2004/0025837 A1 | 2/2004 | Hunt et al. |
| 2004/0034460 A1 | 2/2004 | Folkerts et al. |
| 2004/0040283 A1 | 3/2004 | Yasui et al. |
| 2004/0040287 A1 | 3/2004 | Beutel et al. |
| 2004/0050037 A1 | 3/2004 | Betta et al. |
| 2004/0055278 A1 | 3/2004 | Miyoshi et al. |
| 2004/0055575 A1 | 3/2004 | McCarthy, Jr. et al. |
| 2004/0060284 A1 | 4/2004 | Roberts, Jr. et al. |
| 2004/0074226 A1 | 4/2004 | Tanaka |
| 2004/0089279 A1 | 5/2004 | McLaughlin et al. |
| 2004/0112335 A1 | 6/2004 | Makino et al. |
| 2004/0118117 A1 | 6/2004 | Hartman et al. |
| 2004/0128058 A1 | 7/2004 | Andres et al. |
| 2004/0129259 A1 | 7/2004 | Mitsutani |
| 2004/0134464 A1 | 7/2004 | Mogi |
| 2004/0135584 A1 | 7/2004 | Nagy et al. |
| 2004/0139735 A1 | 7/2004 | Zhu |
| 2004/0139951 A1 | 7/2004 | Fisher et al. |
| 2004/0249558 A1 | 12/2004 | Meaney |
| 2005/0088653 A1* | 4/2005 | Coates et al. ............... 356/419 |

FOREIGN PATENT DOCUMENTS

| | | |
|---|---|---|
| DE | 10219382 | 11/2002 |
| EP | 1221544 | 7/2002 |
| JP | 59190443 | 10/1984 |
| WO | WO 02/101208 | 12/2002 |

| | | |
|---|---|---|
| WO | 03065135 | 8/2003 |
| WO | WO 2004/027230 | 4/2004 |

OTHER PUBLICATIONS

Belanger, Real-Time Simulation Technologies for the Simulation of Electric Drives and Large Systems, Opal-RT Technologies, SAE, 66 pages, 2004.

Banaszuk et al., "An adaptive algorithm for control of combustion instability," Science Direct, Automatica 40, pp. 1965-1972, 2004.

"dSpace Calibration System," pp. 1-31, Apr. 2005.

Savaresi, et al., "Identification of semi-physical and black-box non-linear models: the case of MR-dampers for vehicles control," Science Direct, Automatica 41, pp. 113-127, 2005.

"Detroit Diesel Series 60 EGR Technician's Manual," Detroit Diesel Corporation, 195 pages, 2005.

"SCR, 400-csi Coated Catalyst," Leading NOx Control Technologies Status Summary, 1 page prior to the filing date of the present application.

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to filing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al. "Catalytic Emission Control for Heavy Duty Diesel Engines," JM, 46 pages, prior to filing date of present application.

Delphi, Delphi Diesel NOx Trap (DNT), 3 pages, Feb. 2004.

GM "Advanced Diesel Technology and Emissions," powertrain technologies—engines, 2 pages, prior to filing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to filing date of present application.

http://www.mathworks.com/products/mbc, "Model-Based Calibration Toolbox 3.0.1," The MathWorks, 3 pages, printed May 1, 2006.

http://www.not2fast.wryday.com/turbo/glossary/turbo_glossary. shtml, "Not2Fast: Turbo Glossary," 22 pages, printed Oct. 1, 2004.

http://www.tai-cwv.com/sbl106.0.html, "Technical Overview-Advanced Control Solutions," 6 pages, printed Sep. 9, 2004.

Jung et al., "Control-Oriented Linear Parameter-Varying Modelling of a Turbocharged Diesel Engine," 6 pages, prior to Dec. 29, 2005.

Jung et al., "Parameterization and Transient Validation of a Variable Geometry Turbocharger for Mean-Value Modeling at Low and Medium Speed-Load Points," Society of Automotive Engineers, 14 pages, 2002.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18th IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu, "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

Moraal et al., "Turbocharger Modeling for Automotive Control Applications," Society of Automotive Engineers, Inc., pp. 1-15, 1999.

National Renewable Energy Laboratory (NREL), "Diesel Emissions Control- Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Observers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The MathWorks, "Model-Based Calibration Toolbox 2.1 Calibrate complex powertrain systems," 4 pages, printed prior to filing date of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Tsai et al., "Dynamic Turbocharged Diesel Engine Model for Control Analysis and Design," Society Automotive Engineers, Inc., 6 pages, 1986.

Van Nieuwstadt et al., "Decentralized and Multivariable Designs for EGR-VGT Control of a Diesel Engine," 6 pages, prior to Dec. 29, 2005.

Yanakiev et al., "Engine and Transmission Modeling for Heavy-Duty Vehicles," California Partners for Advanced Transit and Highways, PATH Technical Note 95-6, 64 pages, May 1995.

Zenlenka, et al., "An Active Regeneration as a Key Element for Safe Particulate Trap Use," SAE Paper No. 2001-0103199, 13 pages, Feb. 2001.

\* cited by examiner

CALIBRATION OF ENGINE CONTROL SYSTEMS

BACKGROUND

The present invention pertains to engines and particularly to engine controls. More particularly, the invention pertains to calibration of engine controls.

SUMMARY

The invention is a tool for calibration of an engine control system.

DESCRIPTION

The calibration of a control system for diesel engines is a very laborious and expensive process for automakers. Much time may be spent on experimenting with the engine to model or map the engine and then generating the best controller calibration (also referred to as tuning) parameters for the engine control system. A seemingly urgent need at the moment may be the speeding-up of the engine calibration process. Model-based approaches that help shorten dynometer times may also be greatly needed.

The present invention may be a tool that takes inputs which include actuator setpoints, sensor measurements and performance requirements. The requirements may include acceleration, emissions, robustness, fuel economy, and more. The tool may contain an algorithm which computes engine calibration parameters which result in an engine controller that satisfies or allows a tradeoff among the performance requirements.

The invention may include a computer having a tool designed for performing model identification and generating controller tuning parameters. The making of the tool may require one to design and code the software, and to design and make a connection with a test rig, and also to make the production control software.

Figure 1:
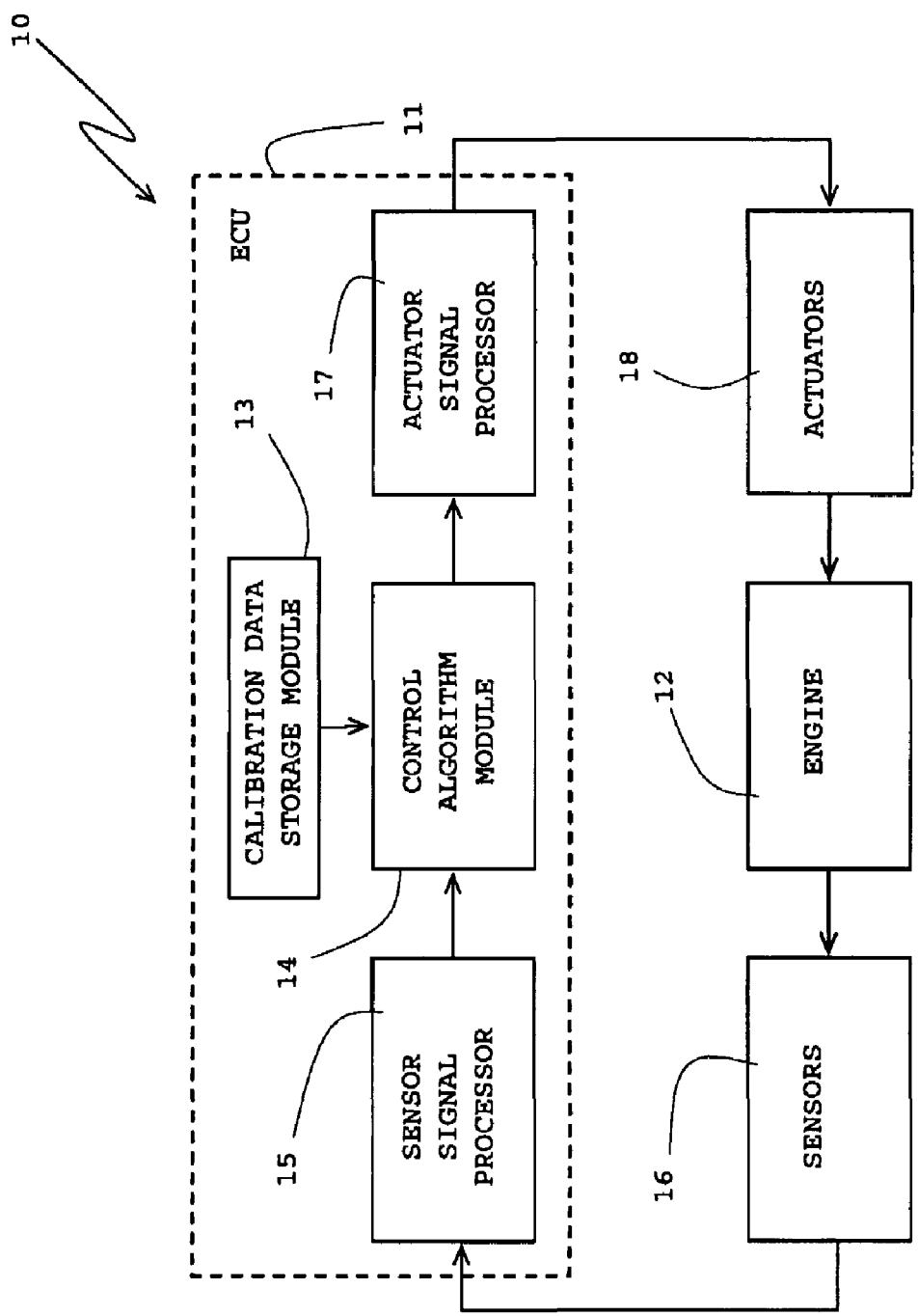
FIG. 1 is a diagram of a basic engine control setup.

A basic engine control set-up may include an ECU 11 connected to an engine 12, as shown in FIG. 1. Calibration data from a calibration data storage module 13 may be input to a control algorithm module 14. The algorithm of module 14 may receive an input from a sensor signal processor 15 which provides parameter information about the engine 12. The information of the engine 12 may be obtained from various sensors 16 on the engine 12 which are connected to the sensor signal processor 15. Control signals, processed in conjunction with data from module 13, from the algorithm module 14 may go to an actuator signal processor 17 which provides control signals in a format for appropriate operation of various actuators 18 on the engine 12 for control of various parameters.

A basic concern of engine control is to develop calibration data to be accessed from the module 13 by the control algorithm of module 14 such that the closing the loop around the engine 12 may result in acceptable performance with respect to the user requirements. User requirements may often be set by the engine manufacturer and at a high level reflect the requirements of the end user. These requirements may include, but not be limited to, emissions, fuel economy, drivability and noise, vibration and harshness (NVH). The emissions, which need to satisfy regulated levels, are usually specified by a regulating body such as the EPA. There may be minimum fuel economy expectations or requirements. The drivability may be indicated by torque and speed requirements. NVH may need to be kept within acceptable levels.

The electronic control unit (ECU) 11 may include a digital computer that controls engine (and sometimes transmission, brake or other car system) operations based on data received from various sensors 16. Examples of these operations used by some manufacturers may include an electronic brake control module (EBCM), an engine control module (ECM), a powertrain control module (PCM) or a vehicle control module (VCM).

Figure 2:
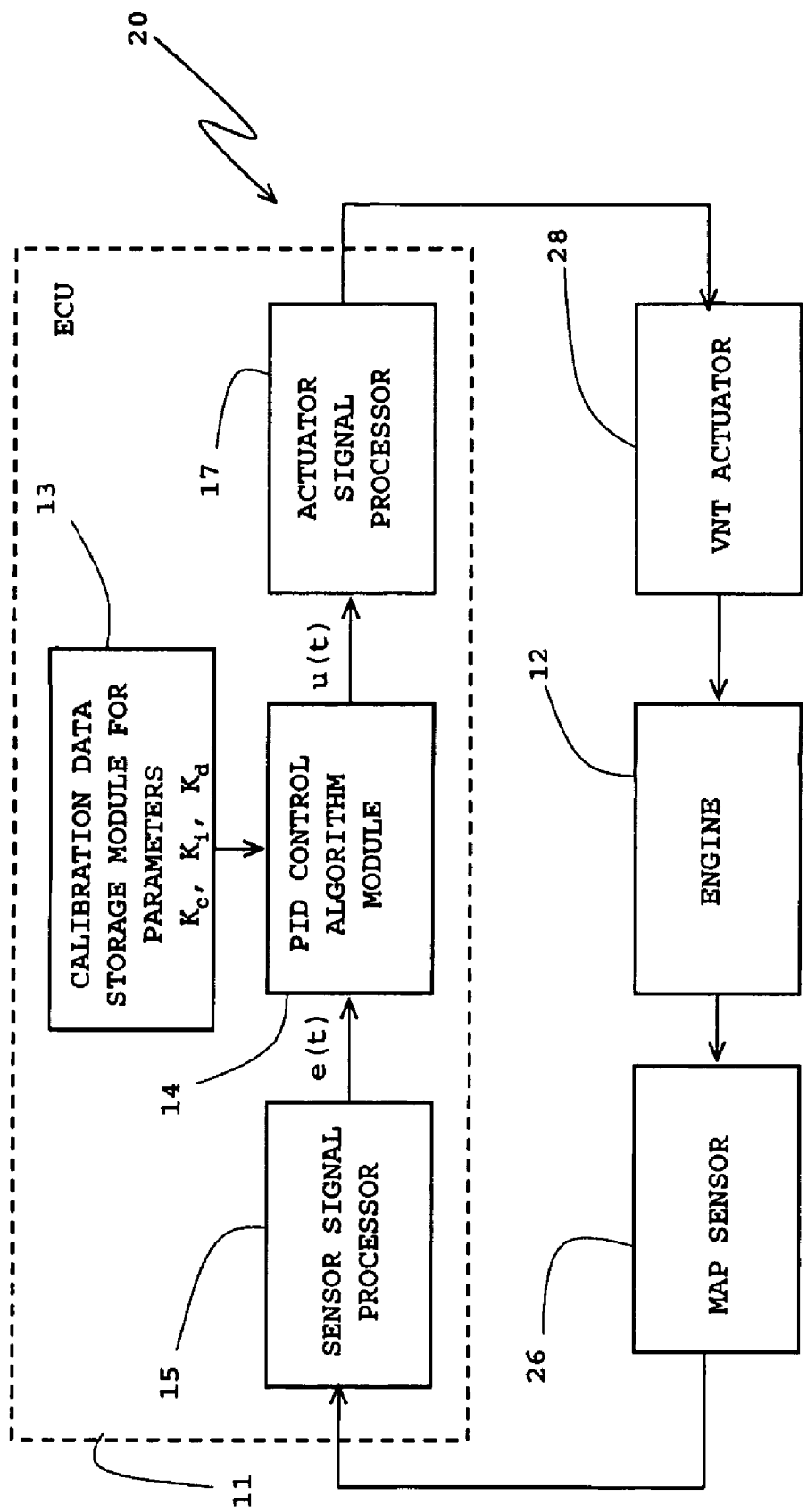
FIG. 2 shows an engine control setup diagram for a simple single variable.

FIG. 2 shows an instantiation 20 of a control of the setup 10 in FIG. 1, such as a control of the boost pressure to a desired or target value for a supercharged engine 12. This setup may be an example used for a simple single variable. Calibration parameters $K_c$, $K_i$, and $K_d$ (i.e., PID control algorithm constants) of module 13 may go to a control algorithm module 14 to be operated on by a PID (proportional, integral, and derivative) control algorithm. The algorithm module 14 may receive sensor information from the sensor signal processor 15 which in turn may receive the information from a MAP (manifold absolute pressure) sensor 26. The MAP sensor 26 may measure pressure in the intake manifold of the engine 12. The processor 15 may provide an e(t) error signal to the algorithm module 14. The e(t) signal is an error signal containing the difference between the desired boost pressure and the measured boost pressure. An output u(t) signal (i.e., actuator signal) may be sent through the actuator signal processor to a VNT (variable vane turbine) actuator 28 to set the boost pressure according to the u(t) signal. The actuator 28 may adjust the vane positions in the turbocharger turbine.

A PID control algorithm may be provided by the following equation.

$$u(t) = K_c \times e(t) + K_i \times \sum_i e(t-i) + K_d \times \Delta e(t)$$

where e(t) is the error signal containing the difference between the desired boost pressure (target) and the measured boost pressure (MAP). $\Delta e(t)$ may be regarded as "e(t)-e(t-1)". A calibration challenge in this case is to design the values of parameters $K_c$, $K_i$, and $K_d$ such that closed-loop performance of the system 20 matches expectations. For example, a requirement may be stated as "when subject to step disturbance of 0.2 bar, the control system shall achieve desired boost pressure to within 5 percent accuracy in less than 1 second". Often the calibration parameters may be required to be developed as a function of engine and ambient conditions. For instance, the values of $K_c$, $K_i$, and $K_d$ may depend upon or change as a function of on engine speed and load or fueling rate. Also, ambient air temperature and pressure may affect the values of $K_c$, $K_i$, and $K_d$.

Figure 3:
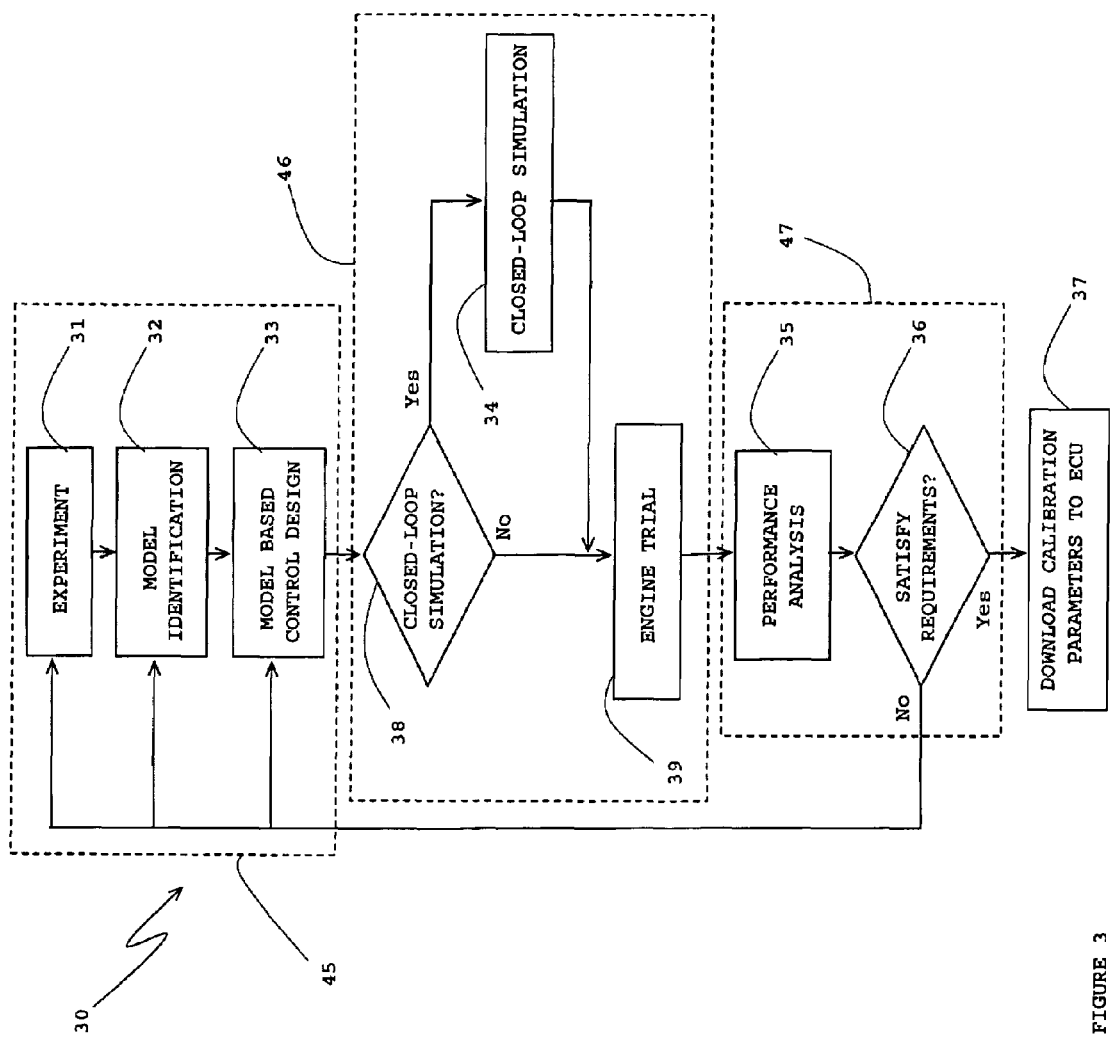
FIG. 3 is a flow diagram of a multivariable control calibration approach.

The present calibration process may rely on generating or determining values for the controller calibration parameters using standard model based control designs that require a model of the dynamics of the engine 12. FIG. 3 shows a process flow diagram 30 is intended to illustrate this determination or generation of values. Each of the stage or steps of diagram 30 may be referred to as modules. In an experiment 31, with the control in open-loop one may separately or simultaneously step each of the actuators or combinations of the actuators that are to be used in a multivariable controller. Multiple step tests may be designed to excite local dynamics at several operational points. Stages of the process may include an experiment 31, a model identification 32, and a model based control design 33. Stages 31, 32 and 33 may compose a model based controller design module 45. The output of 45 is a set of values that may be used for the calibration parameters of the controller.

An application module 46 may be connected to an output of model determination module. At the input of module 46, a question at a decision place 38 may be asked as to whether to do a closed-loop simulation 34 or not relative to the output of module 45. If the answer is "Yes", then one may go to the closed-loop simulation 34 and then to an engine trial 39. If the answer is "No", then one may skip the closed-loop simulation 34 and go directly to the engine trial 39. After the engine trial 39, a performance analysis 35 may be performed on the results of the engine trial 39. The analysis 35 may indicate what the performance numbers are for a given set of values for the calibration parameters output from module 45. A question at a decision place 36 as to whether the requirements are satisfied by the performance numbers may be asked. If the answer is "No", then one may return back to the experiment 31, the model identification 32 or the model based control design stage 33 of model determination module 45, as needed in that order. If the answer is "yes" to a question of the decision place 36, then a downloading of determined values for the calibration parameters, such as PID calibration parameters $K_c$, $K_i$, and $K_d$, to an ECU 11 may be effected. The performance analyzer 35 and decision place 36 may compose an evaluation module 47.

This system 30 may work with multivariable interactions or multivarible control. The calibration parameters of a PID controller may automatically be determined. Various approaches besides PID control may be used. For instance, model predictive control (MPC) may be used.

Figure 4:
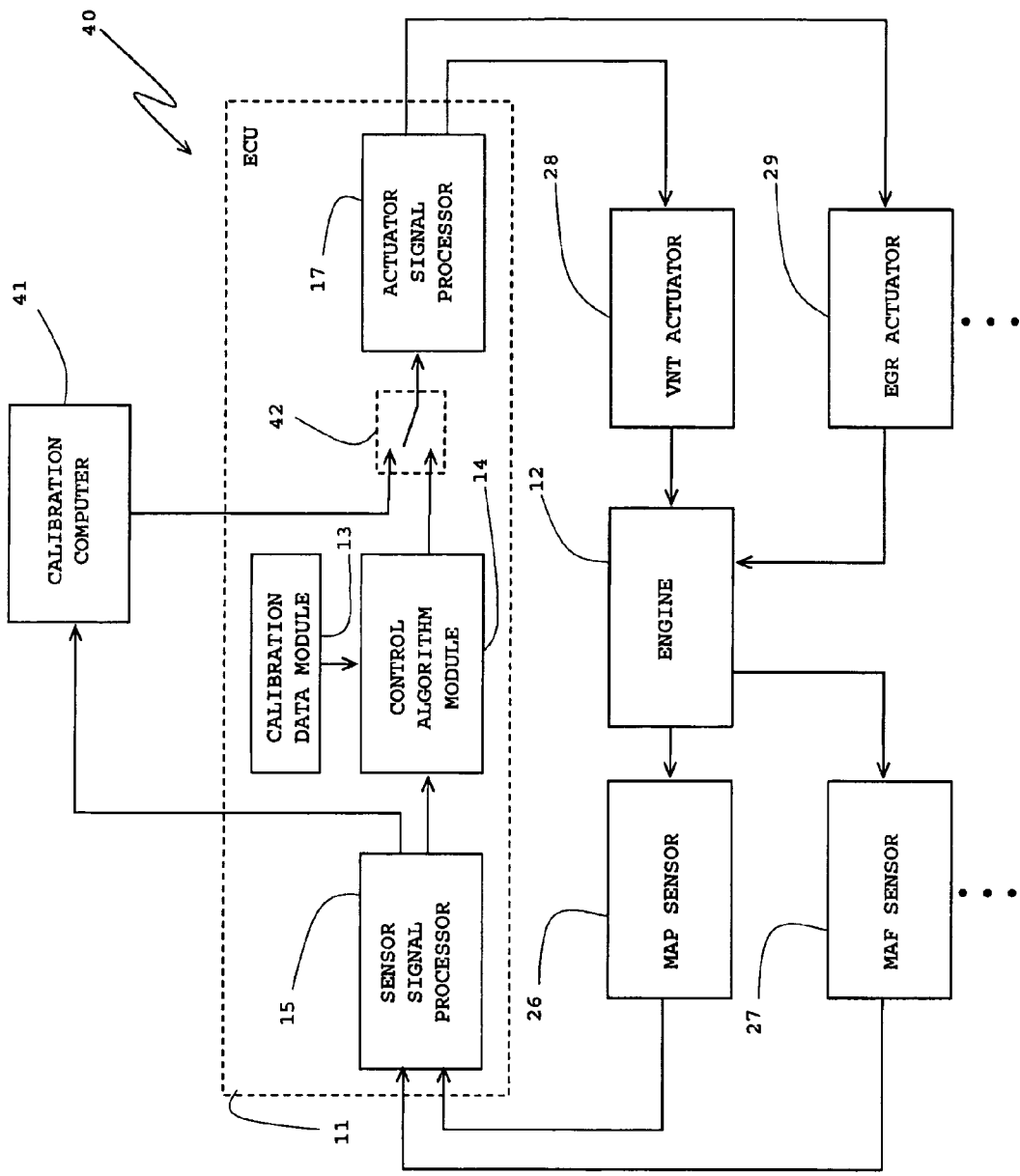
FIG. 4 shows a setup of an experiment step for a multivariable control calibration approach.

For the experiment step or stage 31, one may use a setup as shown in FIG. 4. Stage 31 may essentially bypass the control algorithm and write actuator signals to the ECU 11 that can be beneficial for extracting dynamic model information. The system of FIG. 4 reveals an advancement where an output from the sensor signal processor 15 may go to a calibration computer 41. There may be a switch 42 for disconnecting the output of the control algorithm module 14 from the actuator signal processor 17 and connecting an output of the calibration computer 41 to the processor 17. With the control in the open loop configuration, one may separately step through each of the actuator moves or combinations of actuator moves to be used in the multivariable controller and perform the necessary excitation of the process. The actuator input and sensor output data can then be used to identify the parameters of a dynamical model of the process using standard algorithms. For instance, one version of the diesel engine induction control may be a two-by-two issue where a VNT vane actuator 28 and an EGR valve actuator 29 which are used to control the boost pressure (as measured by a MAP sensor 26) and the manifold air flow (as measured by a MAF sensor 27), respectively. One may perform a step of the VNT vane actuator 28 and the EGR actuator 29 (either separately or simultaneously). Since the response of the engine 12 may change dramatically at different operating points (for example as a function of speed and load or fueling rate), then one may propose multiple step tests designed to excite local dynamics at several operating points. The stepping through the actuators may be done to extract actuator input and sensor output data which is then used to determine the values of the constants that define the dynamical models.

The model identification stage 32 in FIG. 3 may refer to the algorithmic processing of the experimental data in order to calculate parameters of a parameterized model of the dynamics of the engine 12. Model identification algorithms may be used in automotive applications. Standard model identification actuator signals may include steps, ramps, pseudo-random binary signals (PRBS), sine waves or various frequencies, and the like.

The following may reveal a model of the dynamics of an engine. Such a model may be applicable to engine 12. A development of a feedback controller may require a model of the engine dynamics as a function of an operating point and ambient conditions as well as a technique for constructing this model by combining physical insight and experimental results.

If one considers the case of MAP and MAF response to VNT and EGR, and writes a 2-by-2 transfer matrix, $$\begin{bmatrix} y_1(s) \\ y_2(s) \end{bmatrix} = \begin{bmatrix} g_{11}(s) & g_{12}(s) \\ g_{21}(s) & g_{22}(s) \end{bmatrix} \begin{bmatrix} u_1(s) \\ u_2(s) \end{bmatrix},$$

where the symbols $y_1$, $y_2$, $u_1$, $u_2$ represent the physical parameters, then one gets $$\begin{bmatrix} y_1(t) \\ y_2(t) \end{bmatrix} = \begin{bmatrix} MAP(t) \\ MAF(t) \end{bmatrix},$$

$$\begin{bmatrix} u_1(t) \\ u_2(t) \end{bmatrix} = \begin{bmatrix} VNT(t) \\ EGR(t) \end{bmatrix}.$$

Based on various experiments with a model, each single-variable subplant may be well-defined by the sum of two first order responses, $$g_{ij}(s) = \frac{k_{ij}^s}{p_{ij}^s s + 1} + \frac{k_{ij}^f}{p_{ij}^f s + 1}.$$

Then each of the subplants $g_{ij}(s)$ may be characterized by four parameters; 2 gains ($k_{ij}^s$ and $k_{ij}^f$) and 2 time constants ($p_{ij}^s$ and $p_{ij}^f$). The superscripts "f" and "s" are intended to denote "fast" and "slow".

For computational convenience, one may collect the parameters of the differential equation into a 4-vector, $$\theta_{ij}(\sigma) = [k_{ij}^s(\sigma), p_{ij}^s(\sigma), k_{ij}^f(\sigma), p_{ij}^f(\sigma)].$$

The functional dependence of $\theta_{ij}(\sigma)$ on the symbol $\sigma$ indicates that the value of the gains and time constants may depend on some other variables. A study into a representative model appears to show that the scheduling parameters $\sigma$ must at least include the speed and load $\sigma(t) = [N_e(t) \; W_f(t)]$. There may be schedule made relative to the operating point on the intake and exhaust pressures so that $$\sigma(t) = [p_i(t) p_x(t)].$$

The model based control design step or stage 33 may refer to an automatic design of the control algorithm—including its calibration parameters—as a function of the identified model and also performance specifications. One could concentrate on a model predictive control. However, there may be many other multivariable control design techniques that could be used with the present system. Some of these techniques may include robust control (H-infinity or H-2 control), linear parameter varying (LPV) control, LPV H-infinity control, PID control with model based design of calibration parameters, and so forth.

The closed-loop simulation or engine trial step may refer to the testing of a designed control algorithm and calibration parameters. A developed controller may be put into closed-loop with either the real engine or a simulation of the engine. Then a prespecified test or tests (e.g., a running one of the legislated emissions certification cycles) of the closed-loop performance may be performed and the data collected.

The performance analysis step or stage 35 may refer to a using of the calibration software tool to analyze the closed-loop test data in order to make a decision as to whether the closed-loop performance is acceptable or not.

Figure 5:
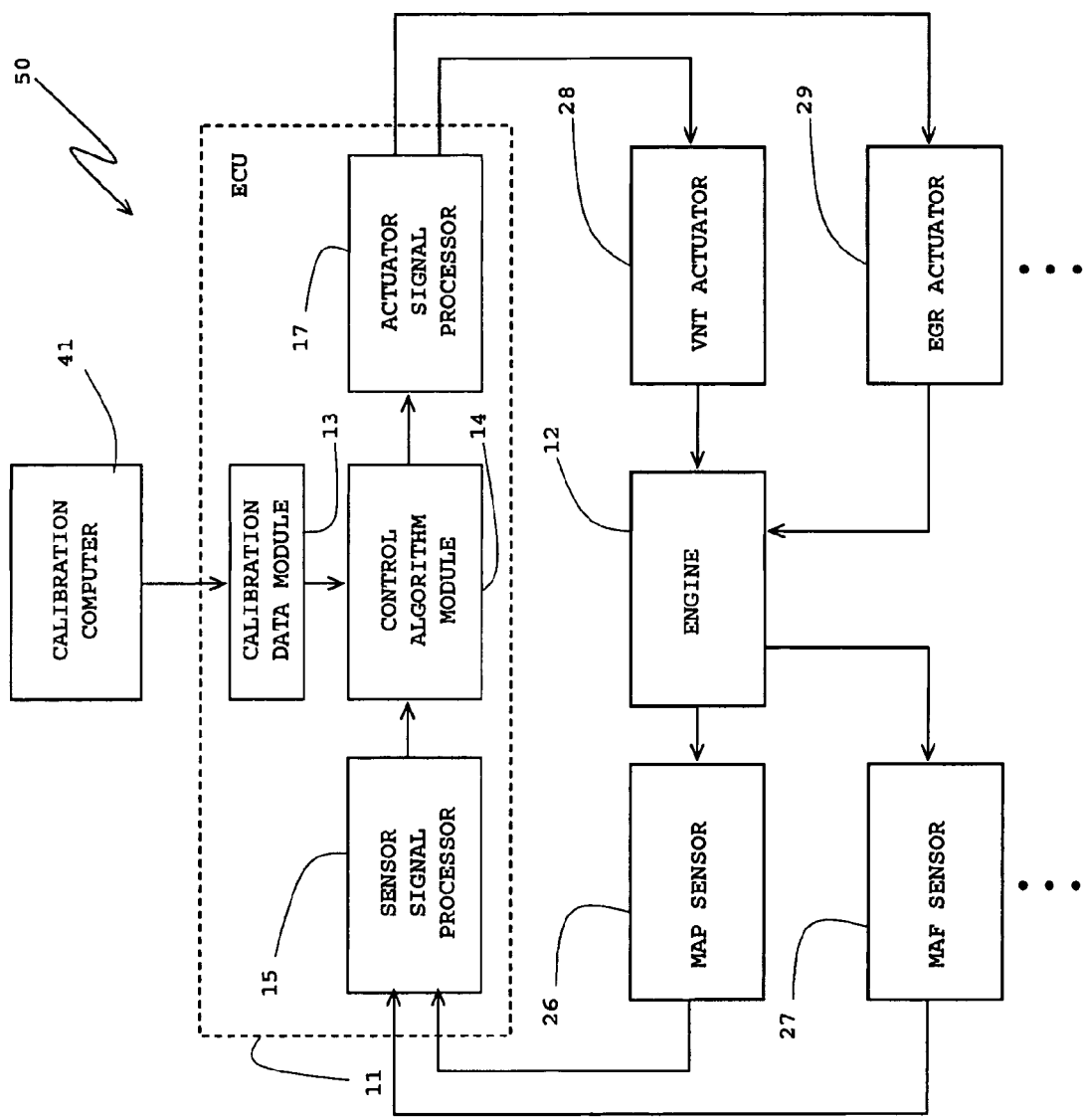
FIG. 5 shows a setup of a download calibration parameters step for the multivariable control calibration approach.

The download calibration parameters step or stage 37 to an ECU 11 may refer to an act of copying the designed calibration parameters into the appropriate memory locations in the ECU 11. FIG. 5 reveals a configuration 50 for this stage. The calibration computer 41 may have its output connected to an input of the calibration data module 13.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A calibration data design tool for determining a model and/or one or more calibration parameters for an Engine Control Unit (ECU) that can be used to control one or more operational aspects of an internal combustion engine, wherein the internal combustion engine includes one or more sensors and one or more actuators, the calibration data design tool comprising:
    a model determination module for determining a model and/or one or more calibration parameters for a model of an internal combustion engine that can be used by an ECU, the model determination module receiving inputs from one or more of the sensors of the internal combustion engine, and providing one or more outputs to one or more of the actuators of the internal combustion engine in an open loop manner;
    an application trial module coupled to the model determination module for operating or simulating an internal combustion engine in a closed loop manner using the model and/or calibration parameters determined by the model determination module; and
    a performance analyzer coupled to the application trial module for analyzing the performance of the internal combustion engine when operated or simulated by the application trial module.

2. The system of claim 1, further comprising a requirements satisfaction indicator coupled to the performance analyzer for indicating whether the performance of the internal combustion engine satisfies one or more requirements.

3. The system of claim 2, wherein the model determination module comprises:
    an experiment stage;
    a model identification stage coupled to the experiment stage; and
    a model based control design stage coupled to the model identification stage and to the application trial module.

4. The system of claim 3, wherein the application trial module comprises:
    a simulation module connected to the model based control design stage; and
    an engine trial module connected to the simulation module and to the performance analyzer.

5. The system of claim 4, wherein the requirements satisfaction indicator is configured to:
    send a start signal to the model determination module if the one or more requirements are not satisfied, and
    download one or more calibration parameters to an engine control unit (ECU) if the one or more requirements are satisfied.

6. The system of claim 5, wherein the experiment stage steps through each actuator that is to be controlled by a multivariable engine control unit (ECU).

7. A calibration system, comprising:
    a calibration computer configured to be coupled to one or more sensors and one or more actuators of a process that is to be controlled;
    wherein the calibration computer comprises:
        a model determination unit for determining a model and/or one or more calibration parameters for a model, the model determination unit configured to receive inputs from the one or more sensors, and to provide one or more outputs to one or more of the actuators in an open loop manner; and
        an application trial module coupled to the model determination unit for operating or simulating the process to be controlled in a closed loop manner using the model and/or calibration parameters determined by the model determination unit.

8. The system of claim 7, wherein the model determination unit comprises an experiment module.

9. The system of claim 8, wherein the experiment module steps through at least one actuator of the one or more actuators in order to determine the model and/or the one or more calibration parameters for a model.

10. The system of claim 9, wherein the model determination unit outputs the model and/or the one or more calibration parameters for a model to the application trial module for testing.

11. The system of claim 10, further comprising:
    an evaluation module connected to the application trial module; and
    wherein the evaluation module determines whether the model and/or the one or more calibration parameters for a model are satisfactory.

12. The system of claim 11, wherein:
    if the model and/or the one or more calibration parameters for a model are not satisfactory, then control is returned back to the model determination unit; and
    if the model and/or the one or more calibration parameters for a model are satisfactory, then the model and/or the one or more calibration parameters for a model are downloaded to a control unit for the process to be controlled.

13. The system of claim 12, wherein the process to be controlled is an internal combustion engine and the control unit is an Engine Control Unit (ECU), and wherein:

the engine control unit comprises a control algorithm module and is connected to the evaluation module; and wherein upon a downloading of the model and/or the one or more calibration parameters for a model, the plurality of actuators are subsequently controlled by the control algorithm module.

14. The system of claim 13, further comprising a plurality of sensors connected to the control algorithm module.

15. The system of claim 14, wherein:

the evaluation module comprises a closed-loop simulator and/or an engine trial module; and the actuators are connected to a plurality of apparatuses associated with an internal combustion engine; and the plurality of sensors is associated with apparatuses with the internal combustion engine.

* * * * *